US008739961B2

(12) United States Patent
Martí Sala et al.

(10) Patent No.: US 8,739,961 B2
(45) Date of Patent: Jun. 3, 2014

(54) PATH CHANGING ROTATIONAL CONVEYOR FOR LIGHTWEIGHT ARTICLES

(76) Inventors: Jaime Martí Sala, Barcelona (ES); Alex Martí Mercadé, Barcelona (ES)

( * ) Notice: Subject to any disclaimer, the term of this patent is extended or adjusted under 35 U.S.C. 154(b) by 327 days.

(21) Appl. No.: 13/203,726

(22) PCT Filed: Feb. 26, 2010

(86) PCT No.: PCT/IB2010/000397
§ 371 (c)(1),
(2), (4) Date: Sep. 26, 2011

(87) PCT Pub. No.: WO2010/100539
PCT Pub. Date: Sep. 10, 2010

(65) Prior Publication Data
US 2012/0024672 A1 Feb. 2, 2012

(30) Foreign Application Priority Data
Mar. 2, 2009 (EP) ...................................... 09380037

(51) Int. Cl.
*B65G 47/00* (2006.01)
*B65G 47/84* (2006.01)
(52) U.S. Cl.
CPC ................... *B65G 47/848* (2013.01)
USPC ..................... 198/471.1; 198/478.1
(58) Field of Classification Search
USPC ................ 198/471.1, 803.5, 867.03, 370.12, 198/377.04, 377.08, 468.4
See application file for complete search history.

(56) References Cited

U.S. PATENT DOCUMENTS

| 3,273,691 | A | * | 9/1966 | Griner | 198/452 |
| 3,837,378 | A | * | 9/1974 | Kanki et al. | 141/146 |
| 3,907,095 | A | * | 9/1975 | Russell et al. | 198/407 |
| 4,710,117 | A | * | 12/1987 | Haas et al. | 425/126.1 |
| 7,219,790 | B2 | * | 5/2007 | Lanfranchi | 198/471.1 |
| 7,497,322 | B2 | * | 3/2009 | Lanfranchi | 198/473.1 |
| 8,006,826 | B2 | * | 8/2011 | Licht | 198/471.1 |
| 8,245,551 | B2 | * | 8/2012 | Egerton | 72/94 |

FOREIGN PATENT DOCUMENTS

| DE | 10 2006 055863 A1 | 5/2008 |
| DE | 102006055963 A1 | 5/2008 |
| EP | 1 594 781 | 1/2008 |
| FR | 2 299 034 A1 | 8/1982 |
| FR | 2 775 270 A1 | 8/1999 |
| JP | 58172109 A | 10/1983 |
| WO | 2007/031239 A1 | 3/2007 |

* cited by examiner

*Primary Examiner* — William R Harp
(74) *Attorney, Agent, or Firm* — Hess Patent Law Firm LLC; Robert J. Hess

(57) ABSTRACT

The path changing rotational conveyor for lightweight articles includes a rotor with receiving configurations distributed along its periphery to be coupled with the lightweight articles and a perimetric wall with a plurality of suction openings in correspondence with the receiving configurations; and a stationary negative pressure chamber defining a laterally open channel facing the perimetric wall of the rotor along a predetermined circumferential arc. The negative pressure chamber is partly delimited by the perimetric wall of the rotor and, when the rotor rotates, the suction openings are communicated directly with the negative pressure chamber along the predetermined circumferential arc. The rotor is connected to a rotation device and the chamber is communicated with a suction source.

18 Claims, 6 Drawing Sheets

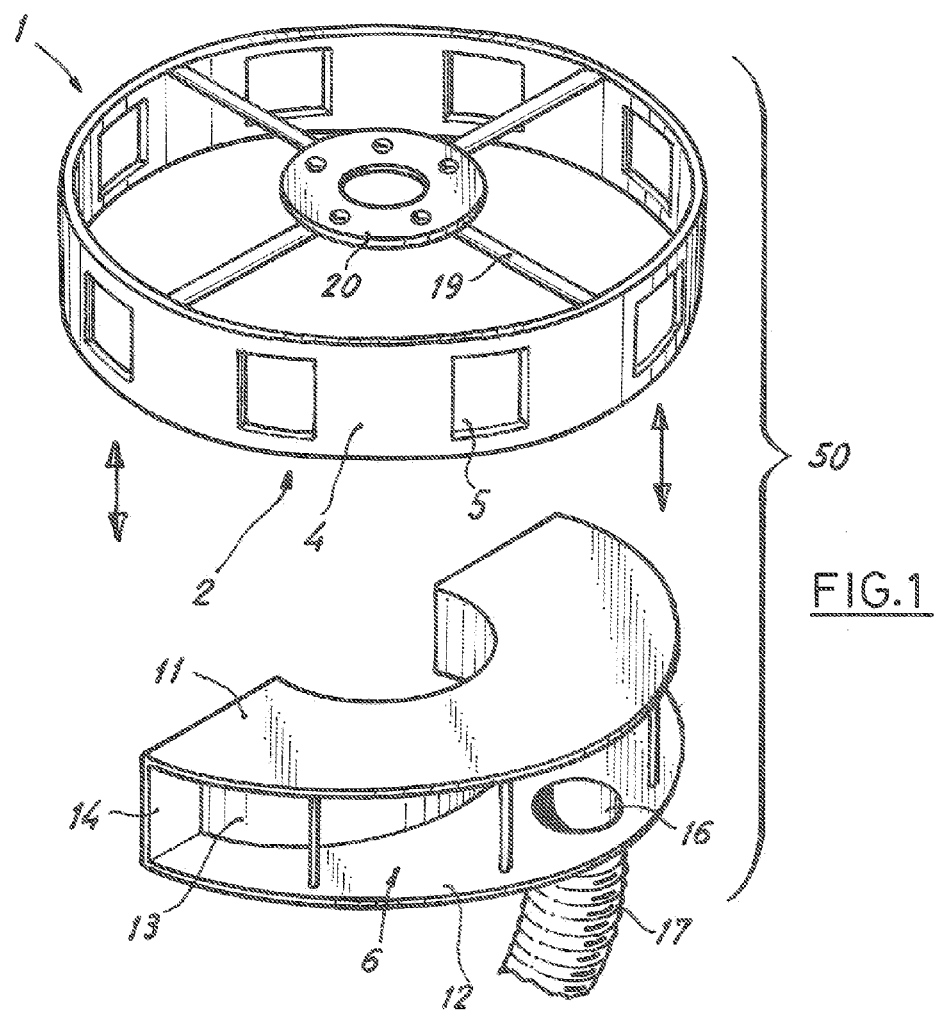
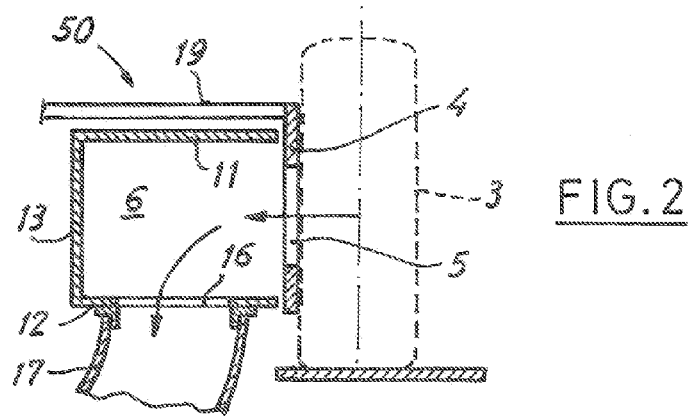

PATH CHANGING ROTATIONAL CONVEYOR FOR LIGHTWEIGHT ARTICLES

TECHNICAL FIELD

The present invention relates to a path changing rotational conveyor for lightweight articles. The rotational conveyor is applicable, for example, for discharging empty plastic bottles or containers from a positioning machine and redirecting them towards a conveyor line, or for redirecting lightweight articles from one conveyor line to another.

BACKGROUND OF THE INVENTION

Patent FR-A-2499034, filed on Nov. 14, 1980, describes a rotational device for redirecting bottles or similar articles coming from a conveyor line towards other conveyor lines. The device comprises a rotor formed by an upper plate and a lower plate which are superimposed, separated and connected to rotate together with respect to a vertical axis. Upper indentations are formed in a perimetric edge of the upper plate and lower indentations are formed in a perimetric edge of the lower plate, such that the mentioned upper and lower indentations, which are vertically aligned, form a plurality of receiving configurations uniformly distributed along the periphery of the rotor to be coupled with the bottles. Between the two plates there is arranged a plurality of outwardly facing suction cups, and each suction cup is in a position corresponding to one of the mentioned receiving configurations. The suction cups are connected by respective conduits to a negative pressure chamber formed in the hub of the rotor, and the negative pressure chamber is in communication with a vacuum source through a rotary joint. A valve is arranged in each of the mentioned conduits, and when the rotor rotates, the valves are selectively opened along a circumferential arc and closed again by cams fixed in a static support. When a valve is opened, the corresponding suction cup experiences a depression capable of holding by suction a bottle against the receiving configuration of the rotor along said circumferential arc. When the valve is closed again, the bottle is released onto another conveyor line.

Patent JP-A-58172109, filed on Apr. 5, 1982, discloses a device for removing defective bottles from a bottle conveying line in response to a signal generated by inspection means. The device comprises a rotor having a construction that is very similar to that described in the mentioned patent FR-A-2499034, except in that here each suction cup is in communication through a conduit with a corresponding hole formed in the lower plate. The lower plate rotates in frictional contact on a stationary fluid distribution plate where there are formed elongated holes connected with a vacuum source through conduits and electrically controlled valves which are selectively opened and closed according to said signal generated by the inspection means. When the rotor rotates, each suction cup can be put in communication with the fluid source when the corresponding hole of the lower plate of the rotor passes over one of the elongated holes of the stationary distribution plate to hold the bottle to the corresponding receiving configuration of the rotor and when one of the mentioned valves is opened.

A drawback of the use of suction cups is that for the operation thereof a type of vacuum at a relatively low relative pressure and a relatively small flow rate is necessary, which is typically obtained by means of a vacuum pump associated to a vacuum tank, which involves relatively high installation and maintenance economic costs. Furthermore, the need to provide a suction cup with its corresponding arrangement of conduits associated to each receiving configuration makes the construction of the rotor complex and increases the economic costs thereof.

Patent EP-A-1594781, with Italian priority of Feb. 19, 2003, describes a rotational conveyor for introducing or extracting empty plastic bottles or containers into or from a positioning machine. The conveyor comprises a rotor formed by separated upper and lower plates, and a plurality of indentations uniformly distributed along the periphery of said two plates, such that the indentations of the upper plate are vertically aligned with the indentations of the lower plate forming receiving configurations to be coupled with the bottles. Each receiving configuration is equipped with a box-like element supported by the lower plate, and each of said box-like elements has a vertical opening made in an outer wall following the concave profile of the corresponding receiving configuration. Horizontal openings are formed in the lower plate, each of which is in communication with one of the box-like elements. The mentioned horizontal openings are arranged along a circumference which is superimposed on an elongated curvilinear slot defined in a stationary chamber in which a negative pressure is created, said elongated slot extending along a predetermined circumferential arc. Thus, when, upon the rotation of the rotor, each horizontal opening passes above the elongated slot, the corresponding box-like element is in communication with the negative pressure chamber and a suction occurs through the vertical opening of the corresponding receiving configuration along the mentioned circumferential arc, said suction being sufficient to hold the empty bottle against the surface of the receiving configuration.

A drawback of this rotational conveyor is that it needs a box-like element associated to each receiving configuration to carry out a function similar to that of the suction cups in the aforementioned documents, and the need to provide a large number of box-like elements makes the construction of the rotor relatively complex and expensive. Furthermore, the receiving configurations of the rotor are adapted for a single bottle format, and providing a different rotor for each bottle format is not cost-effective.

International patent application WO 2007/031239, with Italian priority of Sep. 12, 2005, describes a rotational conveyor with a construction very similar to that of the mentioned patent EP-A-1594781, with the difference that the rotor comprises a plurality of interchangeable receiving elements, each of said receiving elements having a receiving configuration and a vertical opening which is in communication with the corresponding box-like element when the receiving elements is installed in the rotor. The receiving elements have quick connection means for the connection with the upper and lower plates of the rotor. This allows having different sets of receiving elements adapted for different bottle formats. A drawback is that when the rotor is to be adapted to bottles or containers of a different format, a large number of receiving elements of a first type must be uninstalled to then install a large number of receiving elements of a second type, and this operation requires time and is not cost-effective.

Document DE-A-102006055963 discloses a rotary device for transferring objects comprising a rotor having a thick perimetric wall with a plurality of receiving configurations uniformly distributed along its periphery for receiving said objects and conduits through said thick perimetric wall communicating said receiving configurations with a cylindrical inner surface of the thick perimetric wall. Rotation means are provided to make said rotor rotate. A stationary negative pressure chamber connected to a suction source is formed inside the rotor, and said negative pressure chamber is partly delimited by said cylindrical inner surface of the thick perimetric wall of the rotor along a predetermined circumferential arc, such that suction is provided through said conduits to each receiving configuration to hold by suction one of the objects in the receiving configuration along said predetermined circumferential arc.

A drawback with said rotary device is that the conduits communicating the negative pressure chamber with the receiving configurations cause a significant pressure loss due to the small diameter of the conduits with regard the dimensions of the receiving configurations and to the long length thereof due to the large thickness of the perimetric wall. Another drawback is that the thick perimetric wall makes the rotor heavy and difficult to be handled for installing and uninstalling it to and from the device. Still another drawback is that the rotor with the receiving configurations and the conduits has to be obtained by mechanizing a thick block of material, which makes the rotor expensive to be manufactured. The above drawbacks are made worse when the rotor is intended to handle articles of relative big size, such as bottles or containers, instead of small objects such as the preforms described in all the embodiments of cited document DE-A-102006055963.

DISCLOSURE OF THE INVENTION

The present invention contributes to solve or mitigate the previous and other drawbacks by providing a path changing rotational conveyor for lightweight articles, such as, for example, empty plastic bottles or containers, among others, comprising a rotor with a perimetric wall and a plurality of receiving configurations uniformly distributed along its periphery for receiving said lightweight articles, rotation means to make said rotor rotate and suction means for applying a suction in each receiving configuration through suction openings in said perimetric wall, said suction being sufficient to hold by suction one of the lightweight articles against the receiving configuration along a predetermined circumferential arc by which said change of path is obtained. Inside the rotor there is a stationary negative pressure chamber connected to a suction source. Said negative pressure chamber is partly delimited by said perimetric wall of the rotor along said predetermined circumferential arc. In the perimetric wall there is a plurality of windows opening directly to the negative pressure chamber, said windows thus providing said suction openings. The suction openings have a width in the circumferential direction greater than the thickness of the perimetric wall. Thus, when the rotor rotates, the windows which are located in the portion of the perimetric wall of the rotor delimiting the negative pressure chamber along the predetermined circumferential arc are communicated with the negative pressure chamber and through them a suction effect occurs capable of holding by suction the lightweight articles against the receiving configurations of the rotor along said circumferential arc.

With this arrangement, by virtue of the small thickness of the perimetric wall, a lightweight rotor can be obtained that allows it to be installed and uninstalled easily and quickly. Furthermore, by virtue of the small thickness of the perimetric wall and the suction openings in the form of large windows in the perimetric wall the rotor can be made in a simple and economic manner.

By way of illustrative example only, the thickness of the perimetric wall is preferably not more than 5% of the diameter of the rotor, and more preferably not more than 2%. In any case, the thickness of the wall should be only enough to withstand the negative pressure of the negative pressure chamber.

According to a basic embodiment, for example, the rotor has a cylindrical annular wall connected to an anchoring configuration fixed to a central rotating support by radial arms, for example, and the suction openings are directly formed in said cylindrical annular wall. In correspondence, the negative pressure chamber comprises upper and lower walls connected by one or more side walls defining a laterally open channel facing the cylindrical annular wall forming the perimetric wall of the rotor. In some cases, depending on the configuration of the lightweight articles, only the suction openings are sufficient to receive, retain and move the lightweight articles along the predetermined circumferential arc in accordance with the suction force generated therethrough. In other cases, projecting elements can be arranged in the perimetric wall of the rotor between the suction openings to contribute to defining the mentioned receiving configurations for the purpose of being coupled with the lightweight articles. Alternatively, the mentioned radial arms of the rotor can be replaced with a circular plate connected at its outer perimeter to the cylindrical annular wall and provided in its central area with the anchoring configuration connected to the rotating support. In any case, the anchoring configuration is configured to be easily and reversibly fixed, for example by means of a few screws, to the mentioned rotating support, which is arranged to rotate with respect to a vertical axis or together with a vertical axis due to the drive of an electric motor or the like. Thus, when the screws or other reversible fixing means are released, the rotor can be installed and uninstalled by moving it axially in a direction parallel to said vertical axis and passing it around the negative pressure chamber.

According to another embodiment, the rotor comprises an upper plate and a lower plate between which the perimetric wall with the suction openings extends. The receiving configurations are formed, together with the suction openings, by upper indentations formed on a perimetric edge of said upper plate and by lower indentations formed on a perimetric edge of said lower plate. The mentioned upper and lower indentations are aligned mutually and with the suction openings. In this case, the corresponding negative pressure chamber can be substantially identical to the one described previously, i.e., with upper, lower and side walls closing the negative pressure chamber except on one side thereof facing the perimetric wall of the rotor. Nevertheless, it will be understood that when the rotor includes an upper plate and/or a lower plate connected to the perimetric wall, one or both upper and/or lower plates of the rotor can also be used to partially close the negative pressure chamber, in which case the upper wall and/or the lower wall of the negative pressure chamber can be correspondingly omitted. The upper plate of the rotor preferably has an anchoring configuration in its central area to be easily and reversibly fixed, for example by means of a few screws, to a support arranged to rotate with respect to a vertical axis or together with a vertical axis under the drive of a motor, and the lower plate has a central circular opening sized to pass around the negative pressure chamber. Thus, in this embodiment, the rotor can also be installed or uninstalled easily and quickly by moving it axially in a direction parallel to said vertical axis and passing it around the negative pressure chamber when the screws or other reversible fixing means are released.

In any of the embodiments of the rotor, it is preferred that the suction openings are relatively large and are sized and configured such that they are not completely blocked by the lightweight articles when the latter are held by suction in the receiving configurations. The suction source can thus be formed, for example, by a fan or turbine capable of moving a relatively large air flow rate at a speed sufficient to create the mentioned suction effect through the suction openings of the rotor, and the fan or turbine can be connected to the negative pressure chamber through a conduit and an opening in a wall of the negative pressure chamber with relatively large passage areas, or alternatively through several conduits and several openings in the negative pressure chamber. With this arrangement it is not necessary to provide tightness devices between the parts of the negative pressure chamber and of the rotor provided with relative movement or between the suction openings and the lightweight articles.

Given that the rotor according to any of the embodiments has a simple, lightweight and economic construction, and can be installed and uninstalled easily and quickly, the rotational conveyor of the present invention can include a plurality of interchangeable rotors adapted to lightweight articles of different formats or to different conveying pitches. Thus, to make a change of format and/or conveying pitch it is enough to replace a rotor of a first type with a rotor of a second type by means of a simple and quick operation.

The suction effect through each suction opening is generally sufficient to hold the lightweight article against the corresponding receiving configuration of the rotor along the predetermined circumferential arc without needing other additional support means. However, in some cases, and as an optional feature, the rotational conveyor of the present invention can comprise a stationary support surface arranged along the predetermined circumferential arc and at a level slightly lower than the rotor, such that the lightweight articles are supported and slide on said stationary support surface while they are held against the receiving configuration of the rotor and moved by the latter upon rotating. This stationary support surface is useful, for example, to ensure that all the lightweight articles are maintained in a constant vertical position while they are moved by the rotor. When the lightweight articles are empty plastic bottles that are placed standing on their bases, a constant vertical position thereof is useful for ensuring their correct delivery to a subsequent conveyor line, especially if it is a pneumatic type conveyor line conveying the bottles hanging from their necks.

BRIEF DESCRIPTION OF THE DRAWINGS

The previous and other features and advantages will be more fully understood from the following detailed description of exemplary embodiments with reference to the attached drawings, in which:

FIG. 1 is an exploded perspective view of a rotor and a negative pressure chamber forming part of a path changing rotational conveyor for lightweight articles according to a first embodiment of the present invention;

FIG. 2 is a cross-sectional view of the rotational conveyor of the first embodiment;

DETAILED DESCRIPTION OF EXEMPLARY EMBODIMENTS

Figure 4:
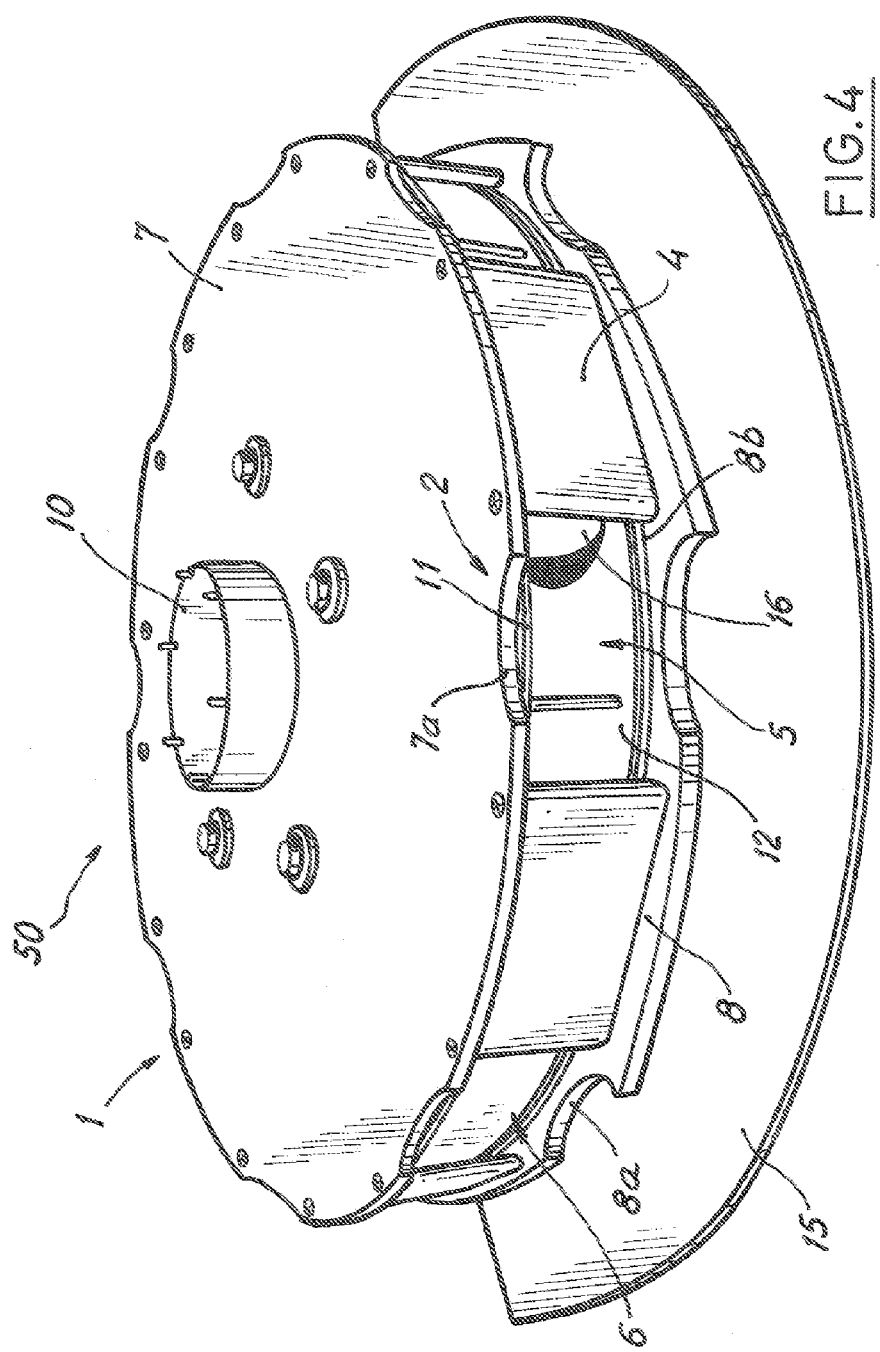
FIG. 4 is a perspective view of the rotational conveyor of the second embodiment.

With reference first to FIGS. 1 and 2, reference number 50 generally designates a path changing rotational conveyor for lightweight articles 3 according to a first embodiment of the present invention, taking into account that FIGS. 1 and 2 only depict two of the essential components of the rotational conveyor 50, such as a rotor 1 and a negative pressure chamber 6. The mentioned rotor 1 comprises a perimetric wall 4 in the form of a cylindrical annular wall connected to a central anchoring configuration 20 by means of radial arms 19. This anchoring configuration 20 is formed such that it can be fixed to a rotating support 9 arranged to rotate with respect to a vertical axis or together with a vertical axis 10 (similar to that shown in FIGS. 4 and 6). The rotor 1 is fixed to the rotating support 9 by reversible fixing means, such as screws or the like. Rotation means, such as an electric motor or the like, are connected to make the rotating support 9 and consequently the rotor 1 when it is fixed to the rotating support 9 rotate. In said cylindrical annular perimetric wall 4 there is formed a plurality of suction openings 5 uniformly distributed along its perimeter, and the mentioned negative pressure chamber 6 provides a suction to each suction opening 5 sufficient to hold by suction one of said lightweight articles 3 against the suction opening 5. Each suction opening 5 thus forms a receiving configuration 2 for receiving a lightweight article 3. Projecting elements (not shown) can optionally be arranged between the mentioned suction openings 5, which projecting elements project radially outwards from the perimetric wall 4, such that every two of said projecting elements contribute to defining one of the receiving configurations 2 together with one of the suction openings 5. The receiving configurations 2 are sized to be coupled with the lightweight articles 3, and the negative pressure chamber 6 provides suction means to hold by suction one of the lightweight articles 3 against the receiving configuration 2 along a predetermined circumferential arc, by which the mentioned change of path is obtained.

The negative pressure chamber 6 (also shown in FIG. 6) is stationary and comprises upper and lower walls 11, 12 connected by one or more side walls 13, 14 defining a laterally open channel which, when the rotor 1 and the negative pressure chamber 6 are assembled in the operating position, as shown in FIG. 2, is facing the perimetric wall 4 of the rotor 1. The laterally open channel defined by the negative pressure chamber 6 extends along said predetermined circumferential arc, and the upper and lower walls 11, 12 of the negative pressure chamber 6 have curved outer edges along said laterally open channel, that are concentric with respect to the perimetric wall 4 of the rotor 1, and said edges are facing and close to an inner surface of the perimetric wall 4 of the rotor 1 (FIG. 2), whereas the radial arms 19 of the rotor 1 pass above the upper wall 11 of the negative pressure chamber 6. The negative pressure chamber 6 is thus partly delimited by that portion of the perimetric wall 4 of the rotor 1 which is located in the predetermined circumferential arc during the rotation of the rotor 1. The negative pressure chamber 6 is connected to a suction source, such as a fan or turbine (not shown), through an opening 16 formed in the lower wall 12 of the negative pressure chamber 6 and a conduit 17. Thus, through the suction openings 5 existing in the portion of the perimetric wall 4 of the rotor 1 which is located in the predetermined circumferential arc during the rotation of the rotor 1a suction force is established which is sufficient to hold the lightweight articles 3 against the receiving configurations 2 of the rotor 1.

The start of the predetermined circumferential arc of the rotational conveyor 50 can be arranged in coincidence with a site of passage of a first conveyor line for lightweight articles 3, and the end of the predetermined circumferential arc can be arranged in coincidence with a site of passage of a second conveyor line for lightweight articles 3. At the start of the predetermined circumferential arc, the suction force through the suction openings 5 will attract and hold the lightweight articles 3 conveyed by the first conveyor line against the receiving configurations 2 of the rotor 1, removing them from the first conveyor line and moving them, due to the effect of the rotation of the rotor 1, along the predetermined circumferential arc. When, due to the effect of the rotation of the rotor 1 the suction openings 5 reach the end of the predetermined circumferential arc and leave the negative pressure chamber 6, the suction force through the suction openings 5 stops and the lightweight articles 3 are released and delivered to the second conveyor line.

FIG. 2 depicts one of the lightweight articles 3 as any undefined body, because the rotational conveyor 50 of the present invention is applicable to a variety of lightweight articles, such as empty plastic bottles or containers, empty boxes, hollow parts, solid parts of lightweight materials, etc.

Figure 3:
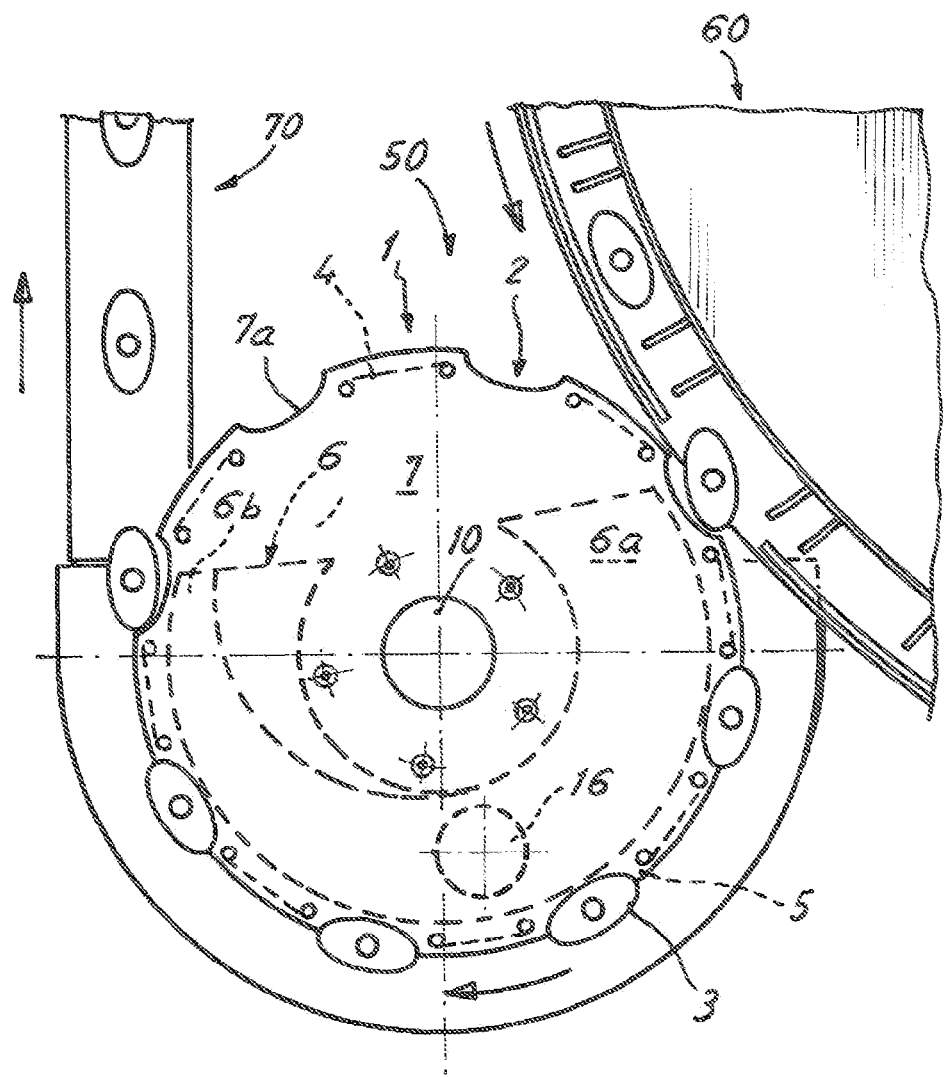
FIG. 3 is a plan view of a path changing rotational conveyor for lightweight articles according to a second embodiment of the present invention, applied to the discharge of empty plastic bottles or containers from a positioning machine.

In relation now to FIGS. 3 to 8, a second embodiment of the rotational conveyor 50 of the present invention is described, which in this case is generally applied to handling lightweight articles 3 such as empty plastic bottles or containers, and more specifically to discharging empty plastic bottles or containers 3 from a positioning machine 60 and to moving said empty plastic bottles or containers 3 along a predetermined circumferential arc to an outlet conveyor line 70, carrying out a change of path (FIG. 3). As in the first embodiment, the rotational conveyor 50 of this second embodiment (best shown in FIGS. 4 and 8) comprises a rotor 1 (shown individually in FIG. 5) arranged to rotate in relation to a negative pressure chamber 6 (shown individually in FIGS. 6 and 7), rotation means to make the rotor 1 rotate and suction means to create a depression in the negative pressure chamber 6.

Figure 5:
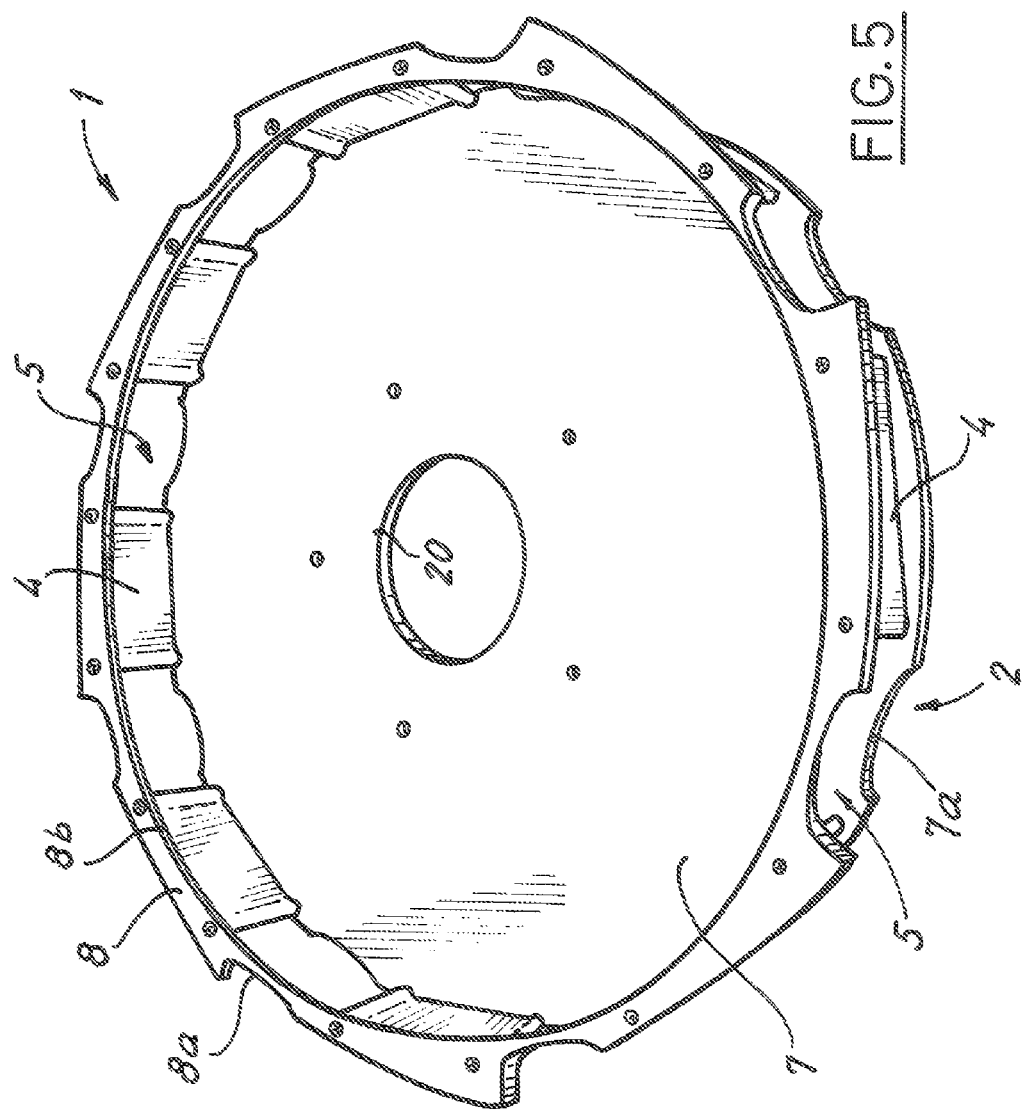
FIG. 5 is a perspective view of a rotor forming part of the rotational conveyor of the second embodiment, said rotor being arranged face up to better show the lower and inner areas thereof.
Figure 8:
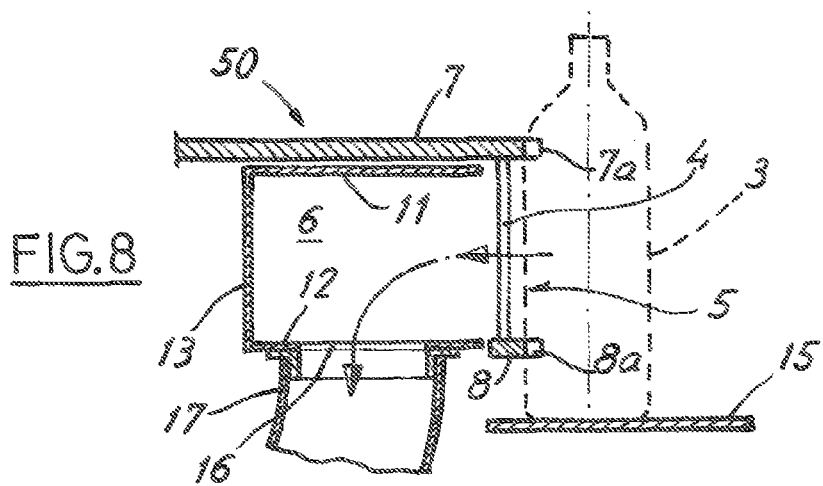
FIG. 8 is a cross-sectional view of the rotational conveyor of the second embodiment.

As best shown in FIG. 5, the rotor 1 comprises in this case an upper plate 7 and a lower plate 8, which are separated, between which the perimetric wall 4 defining the suction openings 5 extends. In the illustrated example, the perimetric wall 4 is formed by a plurality of separated sections fixed at their ends to the upper and lower plates 7, 8, for example by means of screws or similar fixing means, and the suction openings 5 are simply formed by the separations between the sections of the perimetric wall 4. Each suction opening 5 is in a position corresponding to one of the receiving configurations 2, which in this case are defined by upper indentations 7a formed on a perimetric edge of the upper plate 7 and by lower indentations 8a formed on a perimetric edge of the lower plate 8. The upper and lower indentations 7a, 8a are vertically aligned to be coupled with the standing empty plastic bottles or containers 3, as shown in FIG. 8. The mentioned perimetric edges of the upper and lower plates 7, 8 and the mentioned upper and lower indentations 7a, 8a are preferably placed more radially outwards than the perimetric wall 4, such that the lightweight articles 3 only make contact with surfaces of the upper and lower indentations 7a, 8a when they are coupled to the receiving configurations 2 of the rotor 1. The suction openings 5 are furthermore sized such that they are not completely blocked by the empty plastic bottles or containers 3 when the latter are coupled to the receiving configurations 2.

Figure 6:
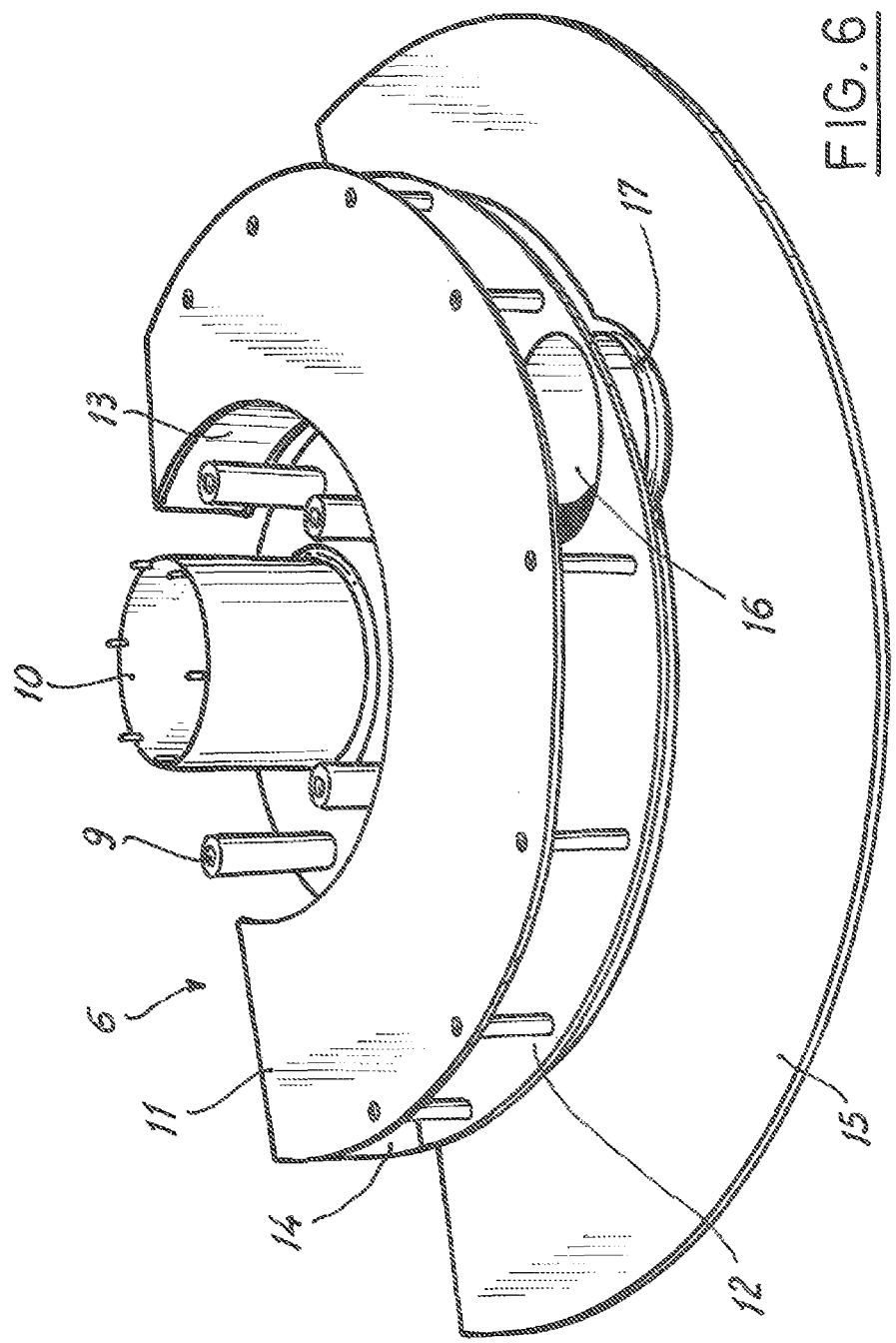
FIG. 6 is a perspective view of a negative pressure chamber forming part of the rotational conveyor of any of the first and second embodiments.
Figure 7:
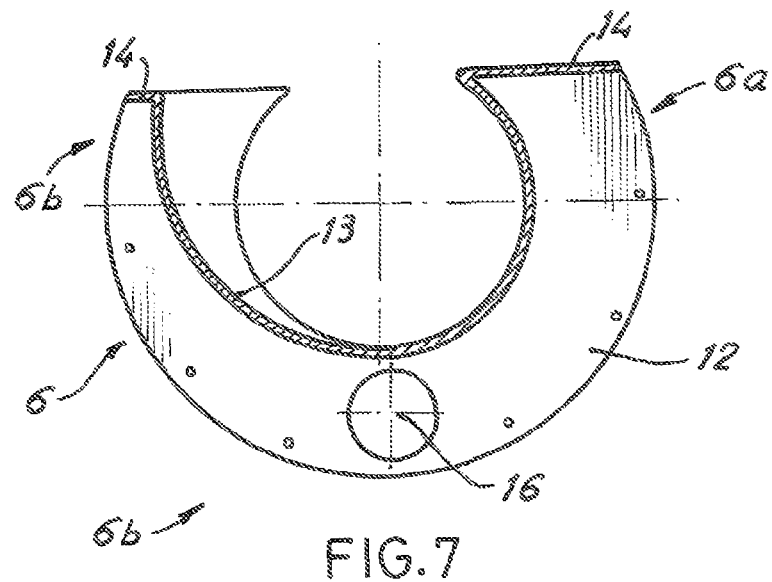
FIG. 7 is a cross-sectional view taken through a horizontal plane of the negative pressure chamber of FIG. 6.

The negative pressure chamber 6 shown in FIGS. 6 and 7 is similar to the one described above in relation to the first embodiment, and is statically installed partly surrounding a rotating support 9 (FIG. 4), which is arranged to rotate with respect to a vertical axis or together with a vertical axis 10 due to the drive of an electric motor or the like (not shown). The negative pressure chamber 6 comprises an upper wall 11 and a lower wall 12, which are separated and side walls 13, 14 connecting the upper and lower walls 11, 12 defining a laterally open channel which, in the operating position, faces the perimetric wall 4 of the rotor 1. The laterally open channel defined by the negative pressure chamber 6 extends along a predetermined circumferential arc, and the upper and lower walls 11, 12 of the negative pressure chamber 6 have, along said laterally open channel, curved outer edges that are concentric with respect to the vertical axis 10 and, consequently, concentric with respect to the perimetric wall 4 of the rotor 1 when the rotational conveyor 50 is assembled. Pillars or other reinforcing elements connecting the upper and lower walls 11, 12 are arranged in an area adjacent to said curved outer edges. A suction source, such as, for example, a fan or turbine (not shown), is connected to the negative pressure chamber 6 through an opening 16 formed in the lower wall 12 and a conduit 17.

In the illustrated example, as is best shown in FIG. 7, the width of the negative pressure chamber 6, i.e., the radial distance from a rear wall 14 and the curved outer edges of the upper and lower walls 11, 12, decreases progressively from an upstream end 6a to a downstream end 6b of the negative pressure chamber 6 in relation to the direction of rotation of the rotor. Consequently, with the rotational conveyor 50 assembled in the operating position, the width of the negative pressure chamber 6 decreases progressively in relation to the perimetric wall 4 of the rotor 1 from the upstream end 6a to the downstream end 6b of the negative pressure chamber 6.

The upper plate 7 of the rotor 1 has in its central area an anchoring configuration 20 configured to be fixed to the rotating support 9 by reversible fixing means, such as screws or the like, and the lower plate 8 has a central circular opening 8b sized to pass around said curved outer edges of the upper and lower walls 11, 12 of the negative pressure chamber 6. Thus, to install the rotor 1 in the rotational conveyor 50 it is sufficient to place the rotor 1 above the negative pressure chamber 6, move the rotor 1 axially downwards in a direction parallel to said vertical axis 10, passing it around the negative pressure chamber 6 until the anchoring configuration 20 of the upper plate 7 of the rotor 1 is coupled with the rotating support 9, and finally install the mentioned reversible fixing means to fix the rotor 1 to the rotating support 9 by means of an easy and quick operation. To uninstall the rotor 1 from the rotational conveyor 50 it is enough to perform the reverse operations. The great ease in installing and uninstalling the rotor 1 in combination with the simple and economic construction thereof allows providing the rotational conveyor 50 with a plurality of interchangeable rotors 1 adapted to lightweight articles 3 of different formats or to different conveying pitches, such that to change the format and/or the conveying pitch it is enough to uninstall a rotor of a first type and replace it with a rotor of a second type.

As shown in FIG. 8, when the rotational conveyor 50 is assembled in the operating position, the upper wall 11 of the negative pressure chamber 6 is below and adjacent to the upper plate 7 of the rotor 1, with the curved outer edge of the upper wall 11 of the negative pressure chamber 6 facing and close to an inner surface of the perimetric wall 4 of the rotor 1, whereas the curved outer edge of the lower wall 12 of the negative pressure chamber 6 is facing and close to an inner edge of the central circular opening 8b of the lower plate 8 of the rotor 1. The perimetric wall 4 of the rotor 1 thus partly delimits the negative pressure chamber 6 along the predetermined circumferential arc.

Figure 9:
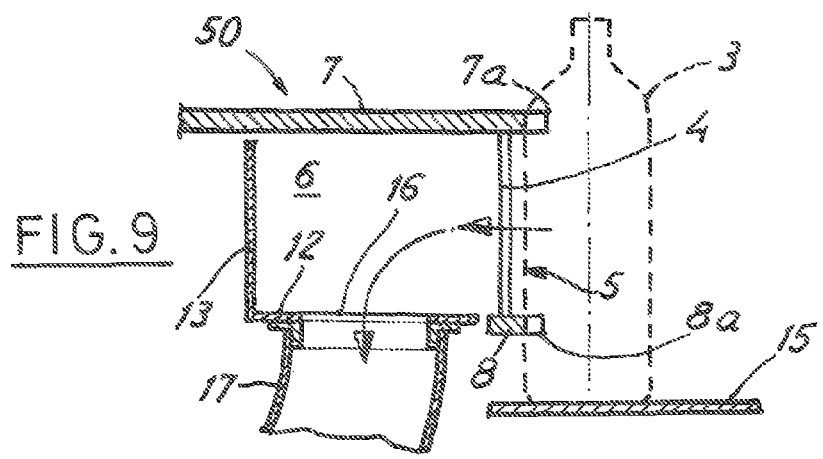
FIG. 9 is a cross-sectional view of a rotational conveyor according to a variant of the second embodiment.

FIG. 9 shows a rotational conveyor 50 according to a variant of the second embodiment in the operating position, in which the rotor 1 is the same as that of FIG. 8 and the variant is based on the fact that the negative pressure chamber 6 lacks the upper wall 11. Thus, the negative pressure chamber 6 of FIG. 9 comprises only a lower wall 12 placed substantially at the same level as the lower plate 8, with the curved outer edge of the lower wall 12 facing and close to an inner edge of the central circular opening 8b of the lower plate 8 of the rotor 1, and side walls 13, 14 with respective upper edges facing and close to the upper plate 7 of the rotor 1. Here, the negative pressure chamber 6 is partly delimited by the upper plate 7 and the perimetric wall 4 of the rotor 1 along the predetermined circumferential arc.

In relation again to FIG. 3, the rotational conveyor 50 of the present invention is arranged such that the upstream end 6a of the negative pressure chamber 6 in relation to the direction of rotation of the rotor 1 coincides in a substantially tangential manner with the path of standing empty plastic bottles or containers 3 aligned in a conveying line formed in a rotating structure of the positioning machine 60. The downstream end 6b of the negative pressure chamber 6 coincides with the start of the path of the outlet conveyor line 70, which can be of different types, for example, a belt conveyor or the like on which the empty plastic bottles or containers 3 are conveyed standing on their bases, or a pneumatic conveyor in which the empty plastic bottles or containers 3 are conveyed hanging by their necks under the drive of one or more air currents.

When, upon the rotation of the rotor 1, the suction openings 5 of the perimetric wall 4 establish fluid communication with the upstream end 6a of the negative pressure chamber 6, a suction force is created through the suction openings 5, and this suction force attracts the empty plastic bottles or containers 3, which are coupled against the receiving configurations 2 of the rotor 1. The empty plastic bottles or containers 3 continue to be held against the receiving configurations 2 of the rotor 1 while the latter rotates along the predetermined circumferential arc defined by the negative pressure chamber 6, until, upon reaching the downstream end 6b of the negative pressure chamber 6, the suction openings 5 of the perimetric wall 4 of the rotor 1 lose the fluid communication with the negative pressure chamber 6 and the empty plastic bottles or containers 3 are released and delivered to the outlet conveyor line 70.

Along the predetermined circumferential arc defined by the negative pressure chamber 6 there is arranged a stationary support surface 15 on which the bases of the empty plastic bottles or containers 3 are supported and slide while they are held against the receiving configurations 2 of the rotor 1 by the suction force through the suction openings 5 and are moved by the rotation of the rotor 1 along the predetermined circumferential arc, as shown in cross-section in FIGS. 8 and 9. This stationary support surface 15, although it is not essential, contributes to ensuring the vertical position of the empty plastic bottles or containers 3 in relation to the rotor 1 while they are moved from the positioning machine 60 to the outlet conveyor line 70. The stationary support surface 15 can optionally be connected to regulation means, such as one or more nut and spindle mechanisms, or other equivalent mechanisms, to regulate the vertical position of the stationary support surface 15 in relation to the rotor 1.

A person skilled in the art will be able to perform modifications and variations to the embodiments shown and described without departing from the scope of the present invention as it is defined in the attached claims.

The invention claimed is:

1. A path changing rotational conveyor for lightweight articles, comprising:
   a rotor with a plurality of receiving configurations uniformly distributed along a rotor perimetric wall for receiving said lightweight articles;
   a perimetric wall provided in said rotor, said perimetric wall having a plurality of suction openings corresponding to the receiving configurations;
   an electric motor to make said rotor rotate;
   a stationary negative pressure chamber connected to a suction source providing a suction to each receiving configuration through said suction openings sufficient to hold by suction one of the lightweight articles against the receiving configuration along a predetermined circumferential arc by which said change of path is obtained;
   said stationary negative pressure chamber being partly delimited by said perimetric wall of the rotor along said predetermined circumferential arc wherein:
   the rotor comprises an upper plate and a lower plate between which said perimetric wall with the suction openings extends, wherein the receiving configurations are complemented by upper indentations in a perimetric edge of said upper plate and by lower indentations in a perimetric edge of said lower plate, said upper and lower indentations being mutually aligned;
   the perimetric wall is formed by a plurality of separated sections fixed at their ends to the upper and lower plates by fixing means, and the suction openings are formed by the separations between the sections of the perimetric wall, and
   the suction openings are sized so as to be not completely blocked by the lightweight articles when the lightweight articles are held by suction in the receiving configurations.

2. The conveyor according to claim 1, wherein projecting elements are arranged in the perimetric wall between the suction openings to contribute to define the receiving configurations.

3. The conveyor according to claim 1, wherein said negative pressure chamber comprises upper and lower walls connected by one or more side walls defining a laterally open channel facing the perimetric wall of the rotor.

4. The conveyor according to claim 1, wherein the upper plate of the rotor has an anchoring configuration to be fixed to a support arranged to rotate with respect to a vertical axis, and the lower plate has a central circular opening sized to pass around the negative pressure chamber.

5. The conveyor according to claim 4, wherein said negative pressure chamber comprises an upper wall adjacent to the upper plate of the rotor, a lower wall substantially at the same level as the lower plate, and one or more side walls connecting said upper and lower walls except on one side of the negative pressure chamber facing the perimetric wall of the rotor.

6. The conveyor according to claim 5, wherein the width of the negative pressure chamber between said one or more side walls and the perimetric wall of the rotor decreases progressively from an upstream end to a downstream end of the negative pressure chamber.

7. The conveyor according to claim 5, wherein said suction source is connected to the negative pressure chamber through an opening formed in said lower wall.

8. The conveyor according to claim 4, wherein said negative pressure chamber comprises a lower wall substantially at the same level as the lower plate, and one or more side walls extending upwardly from said lower wall and having respective upper edges adjacent to the upper plate of the rotor except on one side of the negative pressure chamber facing the perimetric wall of the rotor.

9. The conveyor according to claim 8, wherein the width of the negative pressure chamber between said one or more side walls and the perimetric wall of the rotor decreases progressively from an upstream end to a downstream end of the negative pressure chamber.

10. The conveyor according to claim 8, wherein said suction source is connected to the negative pressure chamber through an opening formed in said lower wall.

11. The conveyor according to claim 4, further comprising a plurality of interchangeable rotors adapted to lightweight articles of different formats and/or to different conveying pitches.

12. The conveyor according to claim 1, further comprising a plurality of interchangeable rotors adapted to lightweight articles of different formats and/or to different conveying pitches.

13. The conveyor according to claim 1, further comprising a stationary support surface arranged along the predetermined circumferential arc and on which the lightweight articles slide while they are held against the receiving configuration of the rotor and moved by the rotor upon rotating.

14. A path changing rotational conveyor for lightweight articles, comprising:
   a rotor with a plurality of receiving configurations uniformly distributed along a rotor perimetric wall for receiving said lightweight articles;
   a perimetric wall provided in said rotor, said perimetric wall having a plurality of suction openings corresponding to the receiving configurations;
   an electric motor to make said rotor rotate;
   a stationary negative pressure chamber connected to a suction source providing a suction to each receiving configuration through said suction openings sufficient to hold by suction one of the lightweight articles against the receiving configuration along a predetermined circumferential arc by which said change of path is obtained;
   said stationary negative pressure chamber being partly delimited by said perimetric wall of the rotor along said predetermined circumferential arc wherein:
   said perimetric wall of the rotor is in the form of a cylindrical annular wall connected to a central anchoring configuration, and the suction openings are formed in said cylindrical annular wall, and
   the suction openings are sized so as to be not completely blocked by the lightweight articles when the lightweight articles are held by suction in the receiving configurations.

15. The conveyor according to claim 14, wherein said negative pressure chamber comprises upper and lower walls connected by one or more side walls defining a laterally open channel facing the perimetric wall of the rotor.

16. The conveyor according to claim 15, wherein the width of the negative pressure chamber between said one or more side walls and the perimetric wall of the rotor decreases progressively from an upstream end to a downstream end of the negative pressure chamber.

17. The conveyor according to claim 15, wherein said suction source is connected to the negative pressure chamber through an opening formed in said lower wall.

18. The conveyor according to claim 14, further comprising a plurality of interchangeable rotors adapted to lightweight articles of different formats and/or to different conveying pitches.

* * * * *